United States Patent
Espeseth et al.

(10) Patent No.: US 6,965,965 B2
(45) Date of Patent: Nov. 15, 2005

(54) DYNAMIC RESPONSE SHAPING FOR COMMAND AGING

(75) Inventors: Adam Michael Espeseth, Rochester, MN (US); David Robison Hall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 10/163,986

(22) Filed: Jun. 6, 2002

(65) Prior Publication Data

US 2003/0229755 A1 Dec. 11, 2003

(51) Int. Cl.[7] ............................................. G06F 12/00
(52) U.S. Cl. ............................. 711/112; 711/168; 710/6
(58) Field of Search ............................ 711/112, 168, 711/113; 710/5–6, 40–42

(56) References Cited

U.S. PATENT DOCUMENTS

| | | | | |
|---|---|---|---|---|
| 4,523,206 A | * | 6/1985 | Sasscer | 711/130 |
| 6,145,052 A | * | 11/2000 | Howe et al. | 711/112 |
| 6,301,639 B1 | * | 10/2001 | Cleavinger et al. | 711/112 |
| 6,895,482 B1 | * | 5/2005 | Blackmon et al. | 711/158 |
| 2002/0178326 A1 | * | 11/2002 | Ohta et al. | 711/113 |

OTHER PUBLICATIONS

Co–pending Patent Application "Adaptive Event–Based Predictive Failure Analysis Measurements in a Hard Disk Drive"; U.S. Appl. No. 10/023,262; filed Dec. 18, 2001.

* cited by examiner

*Primary Examiner*—Kevin Verbrugge
(74) *Attorney, Agent, or Firm*—James R. Nock

(57) ABSTRACT

The present invention provides a method, apparatus and article of manufacture for selecting commands to execute from a command queue in a data storage device. The present invention reduces maximum service times under random queued workloads by executing the oldest command in the queue at a constant and predetermined rate. This yields a minimal yet predictable performance penalty, while significantly reducing maximum service times.

18 Claims, 4 Drawing Sheets

DYNAMIC RESPONSE SHAPING FOR COMMAND AGING

CO-PENDING RELATED APPLICATIONS

The present invention is related to co-pending application, Ser. No. 09/995,368, filed Nov. 27, 2001, entitled "Command Aging Method for Data Storage Devices", having a common assignee.

FIELD OF THE INVENTION

The present invention relates generally to disk drive systems, and more specifically to a system and method for selecting commands for execution in data storage system, wherein selection of the oldest commands occurs at a predetermined rate to provide predictability in service time and performance.

BACKGROUND OF THE INVENTION

It is well known in the art to store data on magnetic or optical disk drives. Generally, data is stored on a disk drive on one or more tracks of predetermined format disposed on a disk-shaped recording media. The data is written to and read from the tracks in response to a read/write command issued by a host computer.

When a hard disk drive has more than one command to execute, the commands are placed in a queue from which the next command is chosen. A Rotational Position Optimization (RPO) algorithm is used to reorder the commands for execution.

Presently, many hard disk drives use a Shortest Access Time First (SATF) RPO algorithm to determine which command to select. This algorithm works as follows: given a set of commands in a queue, choose the command that can be started (accessed) first. This calculation has two parts, the time to perform the seek and settle operation from the current cylinder to the target cylinder, and the latency between this point and the starting sector for the command. Together, these two parts make up the expected access time (EAT) for each queued command. Stated differently, EAT is the time required from the completion of one command to the start of the next, plus one revolution multiplied by the probability of a seek, read, or write error.

The SATF RPO algorithm depends on accurate estimates of the expected access time. If the estimate is too low, the actuator may settle on track after the desired sector has passed rotationally, resulting in a "miss" which adds one full revolution to the access time, thus degrading performance. If the estimate is too high, the optimal command candidate is not chosen for execution.

One key problem with a typical SATF RPO algorithm is that commands may remain in the queue unselected for an indeterminate amount of time. The "maximum service time" metric, provided by common benchmarking programs such as Intel's IOMETER, gives an indication of how long commands can remain unselected for a given workload. Although RPO algorithms attempt to maximize overall throughput, this comes at the expense of responsiveness and an increase in maximum service time.

While RPO attempts to maximize overall throughput, a FIFO (First-in-First-out) style command selection process minimizes the maximum command service time over a period of testing. In a FIFO queue, the oldest command in the queue is always selected for execution. This type of selection process insures that all commands have equivalent service times, and this service time is proportional to the depth of the command queue. The average service time for a FIFO queue might be longer than for a reordered queue since the command have higher latency, but the maximum service time over a testing period using the FIFO queue will be the lowest achievable value.

Several other simple techniques have been employed in order to prevent system-level command timeouts and control maximum service time. The most common solution is to force selection of a command if it has been unselected for a predetermined amount of time. This amount of time is typically specified by a customer via a vendor unique mode page byte. This method of command aging is often referred to as a queue timer scheme.

A significant problem with the queue timer scheme is that for certain workloads and queue timer settings, commands may be forced for selection one after another. This occurs because when one or more commands meet the queue timer criteria, a suboptimal command is executed. This command has a longer than average command time, which often causes other commands in the queue to be forced for selection on the next sort. Eventually, all commands in the queue are executed in the order they are received, and reordering does not resume until the queue is completely emptied.

Another approach to make RPO more "age aware" is described in co-pending application, Ser. No. 09/995,368, entitled "Command Aging Method for Data Storage Devices", filed Nov. 27, 2001, hereby incorporated by reference. In this approach, older commands are gradually biased for selection before they would be normally selected. This bias can be added to the RPO score, favoring it for selection during a command sort. While this approach effectively prevents the problems caused by the queue timer approach, the performance penalty can still be unpredictable.

There is a need for a system and method to reduce maximum service times under random queued workloads. This system and method should execute the oldest command in the queue at a constant and predetermined rate, in order to yield a minimal, yet predictable performance penalty, while reducing maximum service time dramatically.

The details of the present invention, both as to its structure and operation, can best be understood in reference to the accompanying drawings, in which like reference numerals refer to like parts.

SUMMARY OF THE INVENTION

The present invention provides a method, apparatus and article of manufacture for selecting commands to execute from a command queue in a data storage device. The present invention reduces maximum service times under random queued workloads by executing the oldest command in the queue at a constant and predetermined rate. This yields a minimal yet predictable performance penalty, while significantly reducing maximum service times.

In a preferred embodiment of the present invention, a method is provided for selecting commands for execution in a data storage device. The method begins by queuing one or more commands for the data storage device, then selecting a next command for execution from the queued commands. The oldest queued command is selected as the next command at a constant predetermined rate. In one embodiment, oldest queued command is selected as the next command every 1 of N times. In one embodiment, the oldest queued command is selected as the next command only if the age of the oldest queued command exceeds a predetermined minimum age threshold value. This predetermined minimum age threshold value may be specified as a mode page byte within the data storage device.

In an alternative embodiment of the present invention, a method is provided for selecting commands for execution in a data storage device. The method begins by queuing one or more commands for the data storage device. Next, a group of one or more old commands selected from the queued commands is created. Finally, a next command is selected from the queued commands, wherein one of the group of old commands is selected as the next command at a constant, predetermined rate. In one embodiment, the step of creating the group of old commands includes the steps of determining an age of the oldest queued command, then selecting all commands that are within a predetermined delta age from the age of the oldest queued command. In a preferred embodiment, the predetermined delta age is stored in a mode page byte within the data storage device. The selection of a command for execution from the group of old commands is made in order to minimize command execution time. In one embodiment, the selection of one of the group of old commands is made only if the age of the selected command exceeds a predetermined minimum age threshold value. The predetermined minimum age threshold value may be specified in a mode page byte within the data storage device.

The present invention also provides a data storage device, including one or more stacked disks. The data storage device further includes a controller for queuing one or more commands for the one or more stacked disks, and for selecting a next command for execution from the queued commands, wherein the oldest queued command is selected as the next command at a constant, predetermined rate. In one embodiment, the oldest queued command is selected as the next command every 1 of N times. In a preferred embodiment, the oldest queued command is selected as the next command only if the oldest queued command exceeds a preferred minimum age threshold value. The minimum age threshold value may be specified in a mode page byte within the data storage device.

Finally, the present invention provides an article of manufacture embodying logic for selecting commands for execution in a data storage device. The article of manufacture first queues one or more commands for the data storage device, then selects a next command for execution from the queued commands, wherein the oldest queued command is selected as the next command at a constant, predetermined rate. In one embodiment, the oldest queued command is selected as the next command every 1 of N times. In a preferred embodiment, the oldest queued command is selected as the next command only if the age of the oldest queued command exceeds a predetermined minimum age threshold. The minimum age threshold value may be specified in a mode page byte within the data storage device.

The details of the present invention, both as to its structure and operation, can best be understood in reference to the accompanying drawings, in which like reference numerals refer to like parts.

DETAILED DESCRIPTION OF THE PREFERRED EMBODIMENTS

Figure 1:
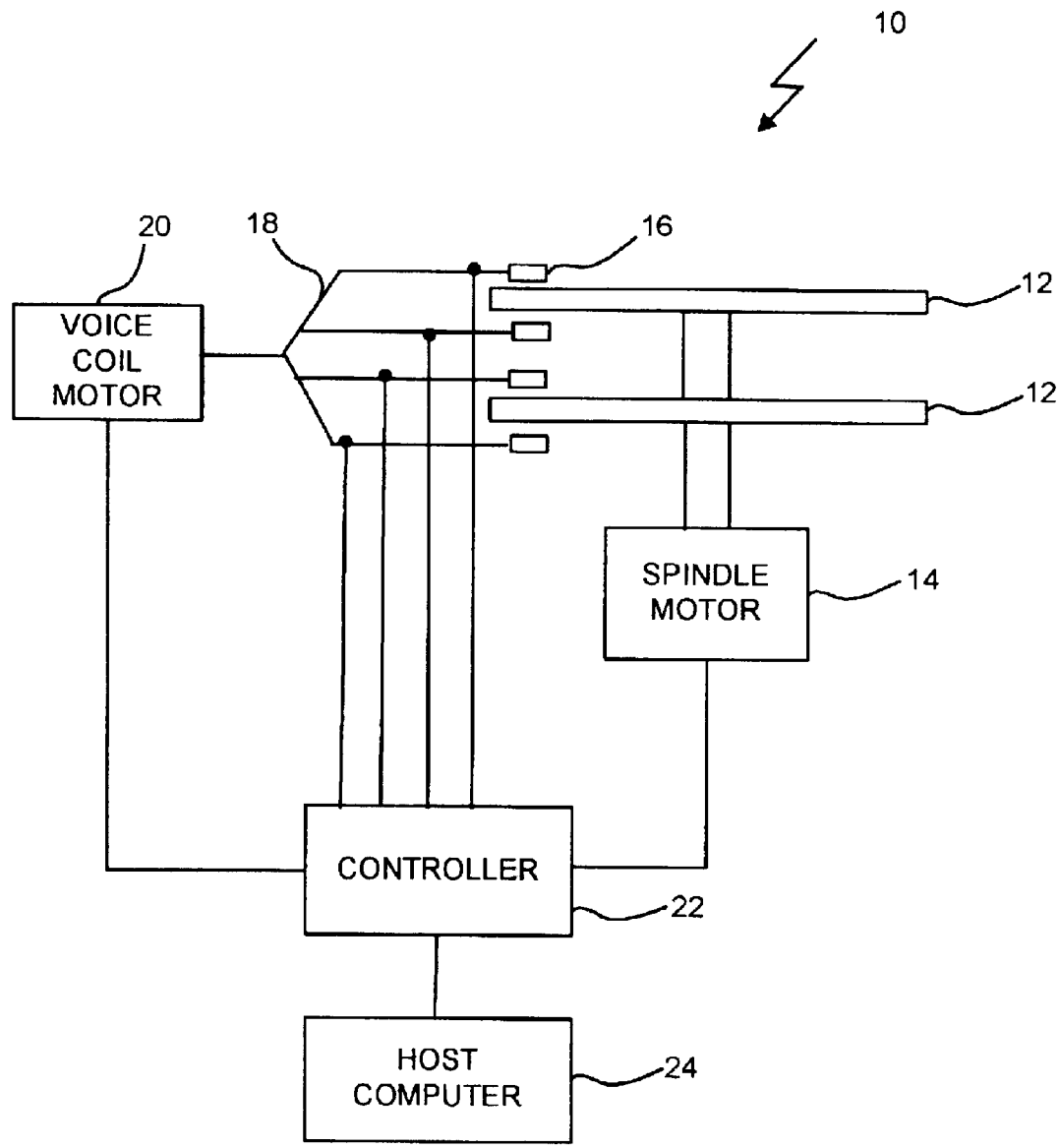
FIG. 1 is an illustration of an exemplary disk drive according to the preferred embodiment of the present invention

Turning to the Drawings, wherein like numbers denote like parts throughout the several views, FIG. 1 is a block diagram of an exemplary disk drive 10 according to the preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope and spirit of the present invention.

A disk drive 10 stores information on the surfaces of one or more stacked disks 12 in the form of transitions or patterns formed on one or more data tracks. The disks 12 are rotatably mounted on a spindle motor 14. Transitions are sensed or "read" from the disk 12 surfaces via one or more transducers 16, known as read/write heads, supported in close proximity to the disk 12 surfaces by a head positioning assembly 18, wherein the transducers 16 convert the transitions into electrical signals. The head positioning assembly 18 positions the transducers 16 over the disk 12 surfaces in a linear or rotary manner by operation of a voice coil motor (VCM) 20, which is controlled by a servo control loop that includes a servo controller 22.

Data is organized on the disks 12 using a series of concentric, radially spaced tracks, wherein a "cylinder" comprises a stack of these tracks across multiple disk 12 surfaces. Each track is divided into a plurality of sectors formatted in a predetermined, standard manner. The format specifies the sequence and location of certain types of information such as track number, sector number, data field, etc. A number of different formats may be used for the tracks.

When a read/write command is issued by a host computer 24, the servo controller 22 (or an interface processor or some other electronics within the disk drive 10) converts logical addresses, i.e., logical block addresses, into their respective physical addresses, i.e., cylinder, read/write head, and sector, and then proceeds to read from and/or write to the physical addresses by moving the read/write heads to the corresponding position on the disk 12 surfaces.

A read/write command issued by the host computer 24 may be queued by the controller 22 with other commands for the disk drive 10. The controller 22 optimizes throughput by selecting the command in the queue that has a minimum expected access time (EAT) value. The EAT is the time required from the completion of one command to the start of the next, plus one revolution multiplied by the probability of a seek, read, or write error.

The present invention, herein referred to as Dynamic Response Shaping (DRS), overcomes problems with prior art systems, such as the queue timer approach and FIFO, by throttling the selection of old commands. Instead of using a fixed queue timer, DRS executes the oldest queued command every N sorts, where N is a tunable parameter. This command is executed regardless of its actual age (although, in one embodiment, a minimum age threshold can also be used).

DRS prevents the problems seen using a queue timer approach, while significantly reducing maximum service times. DRS still presents a performance penalty, but the penalty is tunable to allow for complete control over the tradeoff between service time and performance. In essence, DRS strikes a balance between a FIFO queue and a completely reorderable queue. This balance is achieved by dividing the command selection rate between a FIFO selection process and an RPO selection process.

The algorithm is as follows: for every N RPO selections, force the selection of the oldest command in the queue. The parameter N is selectable via a mode page parameter, which allows a user to define the tradeoff between performance and maximum service time. The overall goal of DRS is to guarantee a certain level of performance, while reducing the maximum service time over a period of testing.

The performance penalty for a given N can be calculated using the following equation:

$$\text{Avg DRS Command Time} = (N-1)/N * \text{Avg Queued Command Time} + 1/N * \text{Avg Unqueued Command Time} \quad (1)$$

In other words, for a given workload, the average command time using DRS will be N−1 parts queued, and 1 part unqueued. In this way, the expected performance for any workload and any N can be calculated and predicted.

DRS executes the oldest command in the queue at a constant rate. Under the queue timer scheme, there is a significant performance penalty if commands reach the maximum queue age at a high rate. DRS, on the other hand, functions like a throttle to control the execution rate of old commands. This does not guarantee that commands cannot reach a certain age, but it guarantees a predictable level of performance.

For this reason, DRS can be used in conjunction with the queue timer command aging scheme (i.e., to set of a reasonable queue timer age) to control and reduce the maximum service time over a period of testing. This insures that commands will never remain unselected longer than the system command timeout period.

Figure 2:
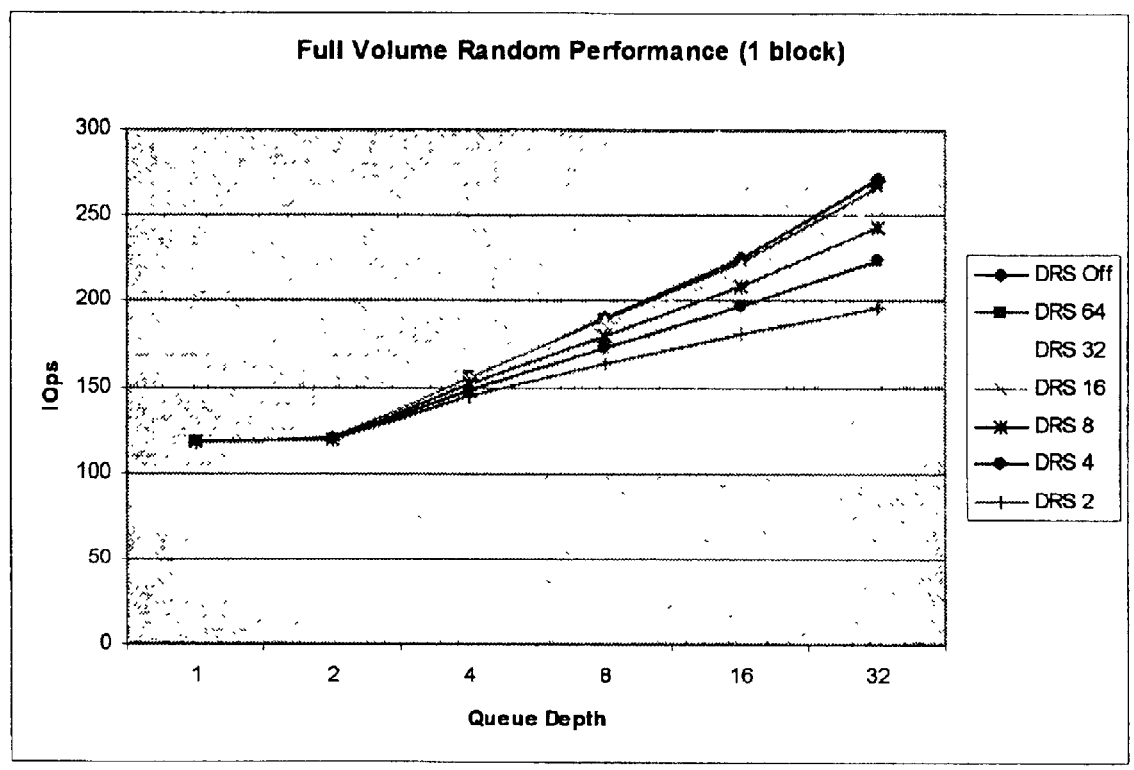
FIG. 2 is a graph illustrating I/O performance for various DRS settings, in accordance with the present invention.

FIG. 2 is a graph illustrating I/O performance for various DRS settings in a representative disk drive, in accordance with the present invention. In general, the graph shows the performance penalty of various DRS settings for the drive by varying N, where N represents the number of RPO selections that occur between the forced selection of the oldest queued command. The test consisted of full volume random reads for 1 block. As shown in FIG. 2, when N is set to 64 or 32, the performance penalty is minimal (i.e., closely approximates the performance of a drive without the DRS feature). As N is reduced to 4 and 2, there is a significant drop in the rate of I/O operations, especially at higher queue depths (e.g., queue depths of 16 and greater).

Figure 3:
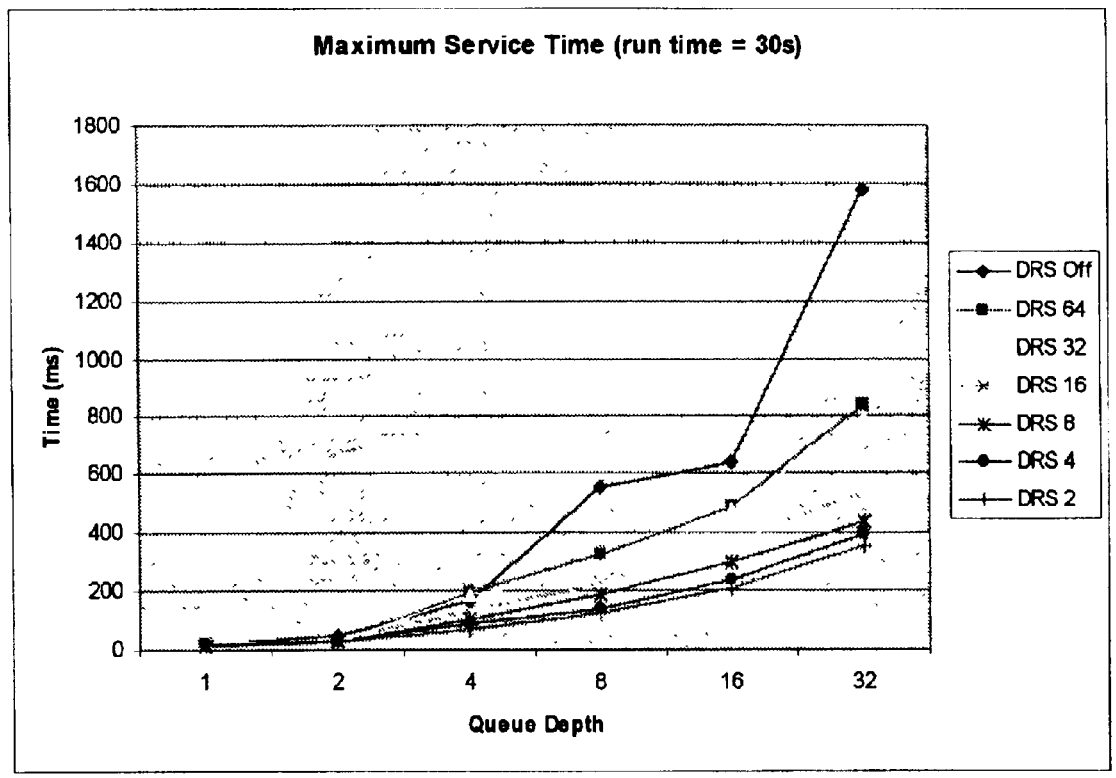
FIG. 3 is a graph illustrating maximum service times for various DRS settings, in accordance with the present invention.

FIG. 3 is a graph illustrating maximum service times for various DRS settings in a representative disk drive, in accordance with the present invention. As can be seen in this graph, DRS reduces maximum service time dramatically. Without DRS, maximum service times are highly unpredictable. However, using DRS, maximum service times are under control, even when using the most conservative N=64 setting.

Figure 4:
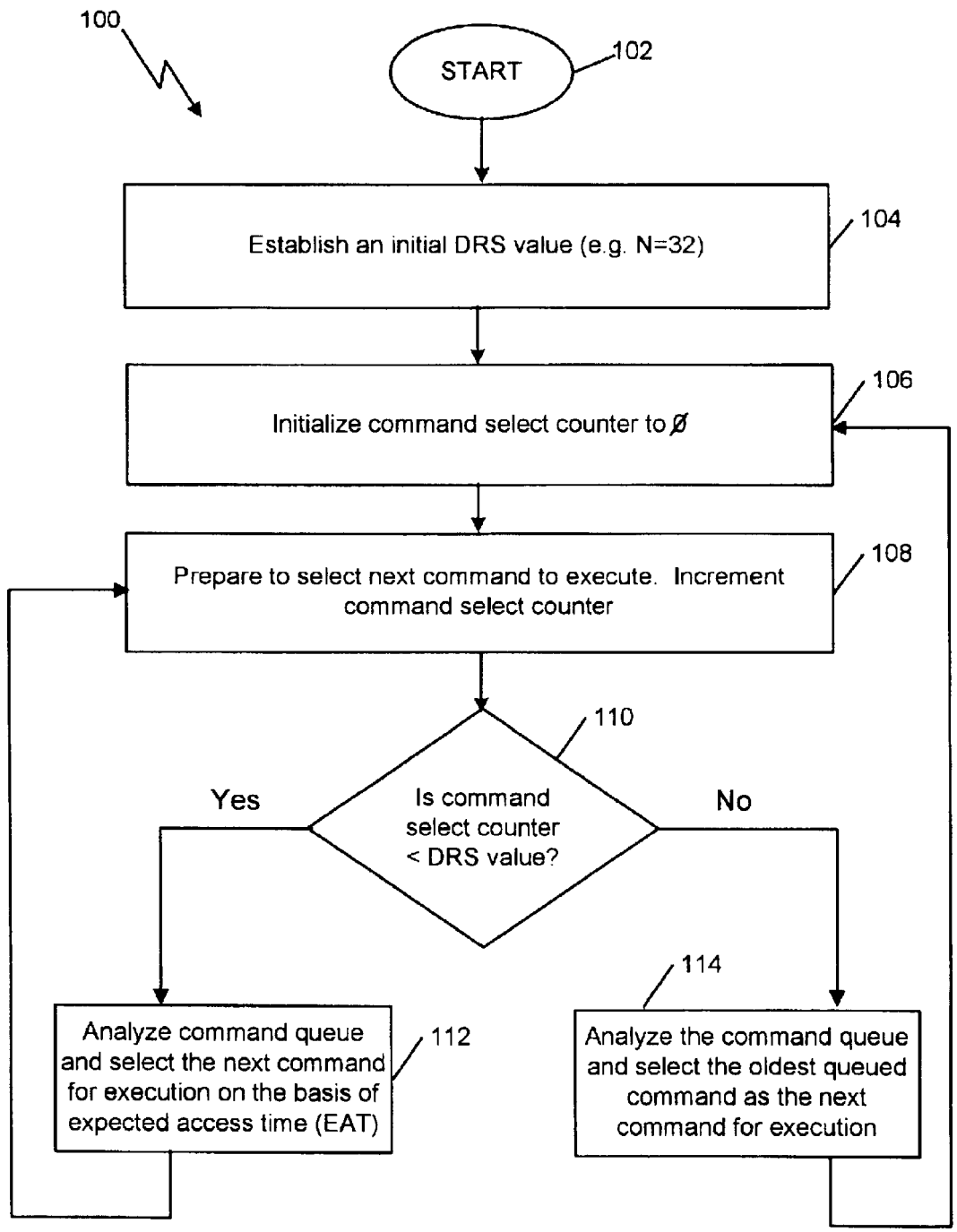
FIG. 4 is a flowchart that illustrates the logic performed by a preferred embodiment of the present invention.

FIG. 4 is a flowchart that illustrates the logic performed by a preferred embodiment of the present invention, shown generally at 100. The method begins at block 102. At block 104 an initial DRS value is established. By way of example, if the DRS value is set to 32, the oldest queued command will be selected for execution every 1 of 32 selections. For the remaining 31 selections, the next command selected for execution will be chosen on the basis of lowest expected access time (EAT). The DRS value is user configurable, and in one embodiment, the DRS value is provided via a mode page byte within the data storage device.

At block 106, the command select counter is initialized to zero. As each command is selected for execution, this counter is incremented. At block 108, the method prepares to select the next command to execute, and increments the command select counter by one. At block 110, the command select counter is compared against the DRS value. If the command select counter is less than the DRS value, execution proceeds to block 112. At block 112, the command queue is analyzed and the next command is selected for execution on the basis of expected access time (EAT). Upon completion of block 112, control passes back to block 108, where the method prepares to select the next command to execute. If the command select counter is equal to the DRS value, execution proceeds to block 114. At block 114, the command queue is analyzed and the next command selected for execution is the oldest queued command. Upon completion of block 114, control passes back to block 106, where the command select counter is reset to zero.

In an alternate embodiment of method 100, a minimum age threshold is hardcoded or specified via a mode page byte. The minimum age threshold specifies a minimum age that a command must meet before being forced for selection by DRS. This additional method step prevents commands that are relatively new from being forced for selection, thus preventing needless degradation of performance in certain cases.

In yet another alternate embodiment of method 100, a delta age threshold is introduced in order to sort between the oldest commands in the queue. In a preferred embodiment, the delta age threshold may be provided via a mode page byte. In this embodiment, instead of always selecting the oldest queued command (i.e., as is done at block 114), DRS selects the best command chosen from a group of commands considered to be the oldest. The criteria for assigning commands to the "oldest group" is whether each command falls within the delta age threshold from the oldest command in the queue. This embodiment still executes an aged command at the normal DRS rate, but the performance penalty is reduced, since RPO is able to select between multiple "old" commands.

Additional modifications may be made to the illustrated embodiments without departing from the spirit or scope of the invention. Therefore, the invention lies in the claims hereinafter appended.

What is claimed is:

1. A method for selecting commands for execution in a data storage device, the method comprising the steps of:

queuing one or more commands for the data storage device; and selecting a next command for execution from the queued commands, wherein the oldest queued command is periodically selected as the next command at a constant, predetermined rate.

2. The method of claim 1, wherein the oldest queued command is periodically selected as the next command every 1 of N times, wherein N is at least 2.

3. The method of claim 1, wherein the oldest queued command is periodically selected as the next command only if the age of the oldest queued command exceeds a predetermined minimum age threshold value.

4. The method of claim 3, wherein the minimum age threshold value is specified in a mode page byte within the data storage device.

5. A method for selecting commands for execution in a data storage device, the method comprising the steps of:

queuing one or more commands for the data storage device;

creating a group of one or more old commands selected from the queued commands; and selecting a next command for execution from the queued commands, wherein one of the group of old commands is periodically selected as the next command at a constant, predetermined rate.

6. The method of claim 5, wherein the step of creating a group of one or more old commands selected from the queued commands includes the steps of:

determining an age of the oldest queued command; and selecting all commands that are within a predetermined delta age from the age of the oldest queued command.

7. The method of claim 5, wherein the predetermined delta age is stored in a mode page byte within the data storage device.

8. The method of claim 5, wherein the periodic selection of one of the group of old commands is made to minimize command execution time.

9. The method of claim 5, wherein the periodic selection of one of the group of old commands is made only if the age of the selected command exceeds a predetermined minimum age threshold value.

10. The method of claim 9, wherein the minimum age threshold value is specified in a mode page byte within the data storage device.

11. A data storage device, comprising:

one or more stacked disks; and a controller for queuing one or more commands for the one or more stacked disks, and for selecting a next command for execution from the queued commands;

wherein the oldest queued command is periodically selected as the next command at a constant, predetermined rate.

12. The data storage device of claim 11, wherein the oldest queued command is periodically selected as the next command every 1 of N times, wherein N is at least 2.

13. The data storage device of claim 11, wherein the oldest queued command is periodically selected as the next command only if the oldest queued command exceeds a predetermined minimum age threshold value.

14. The data storage device of claim 11, wherein the minimum age threshold value is specified in a mode page byte within the data storage device.

15. An article of manufacture embodying logic for selecting commands for execution in a data storage device, comprising:

queuing one or more commands for the data storage device; and selecting a next command for execution from the queued commands, wherein the oldest queued command is periodically selected as the next command at a constant, predetermined rate.

16. The article of manufacture of claim 15, wherein the oldest queued command is selected as the next command every 1 of N times, wherein N is at least 2.

17. The article of manufacture of claim 15, wherein the oldest queued command is periodically selected as the next command only if the age of the oldest queued command exceeds a predetermined minimum age threshold value.

18. The article of manufacture of claim 17, wherein the minimum age threshold value is specified in a mode page byte within the data storage device.

* * * * *